United States Patent [19]

Eicher et al.

[11] Patent Number: 5,570,769
[45] Date of Patent: Nov. 5, 1996

[54] LINEAR AND ROTARY ACTUATOR COMBINATION

[75] Inventors: Fred C. Eicher; Charles F. Evans; Gary M. Rumrill, all of Louisville, Ky.

[73] Assignee: Turn Act, Inc., Louisville, Ky.

[21] Appl. No.: 380,284

[22] Filed: Jan. 30, 1995

Related U.S. Application Data

[63] Continuation-in-part of Ser. No. 990,057, Dec. 14, 1992, Pat. No. 5,404,983.

[51] Int. Cl.⁶ .................................................. F16D 71/00
[52] U.S. Cl. .................. 192/143; 92/2; 92/13.3; 92/62; 92/66; 92/117 R; 92/117 A; 92/165 R; 384/42
[58] Field of Search ..................... 92/2, 13.3, 62, 92/66, 117 R, 117 A, 165 R; 192/143, 139; 384/42

[56] References Cited

U.S. PATENT DOCUMENTS

| | | |
|---|---|---|
| 3,105,723 | 10/1963 | Hamaker, Jr. ........................ 384/42 |
| 3,717,231 | 7/1973 | Kaufeldt . |
| 3,823,651 | 4/1974 | Ogilvie . |
| 4,493,245 | 2/1985 | Kirsch et al. . |
| 4,508,015 | 11/1985 | Lin . |
| 4,509,408 | 9/1985 | Kuroda . |
| 4,557,746 | 6/1985 | Braithwaite et al. . |
| 4,639,169 | 4/1987 | Becker et al. . |
| 4,641,737 | 12/1987 | Gillingham et al. . |
| 4,648,467 | 8/1987 | Ahtola et al. . |
| 4,665,558 | 3/1987 | Burke . |
| 4,824,255 | 1/1989 | Wohlrab . |
| 4,829,880 | 7/1989 | Lieberman . |
| 4,838,403 | 3/1989 | Layer . |
| 4,858,481 | 4/1989 | Abraham . |
| 4,898,080 | 2/1990 | Lieberman ........................ 92/117 RX |
| 5,363,741 | 11/1994 | Takada et al. .................... 92/165 RX |
| 5,367,943 | 11/1994 | Stoll et al. .................................. 92/2 |
| 5,404,983 | 6/1995 | Eicher et al. . |

Primary Examiner—Andrea L. Pitts
Attorney, Agent, or Firm—Wheat, Camoriano, Smith & Beres, PLC

[57] ABSTRACT

A rotary actuator and a linear actuator are combined to provide an output shaft with independent linear and rotary motion. The linear actuator causes the rotary actuator to move linearly, and there is a guide which restricts the movement of the rotary actuator to linear motion and a bearing which receives the output shaft of the rotary actuator to prevent orbiting and deflection of the rotary output shaft.

4 Claims, 4 Drawing Sheets

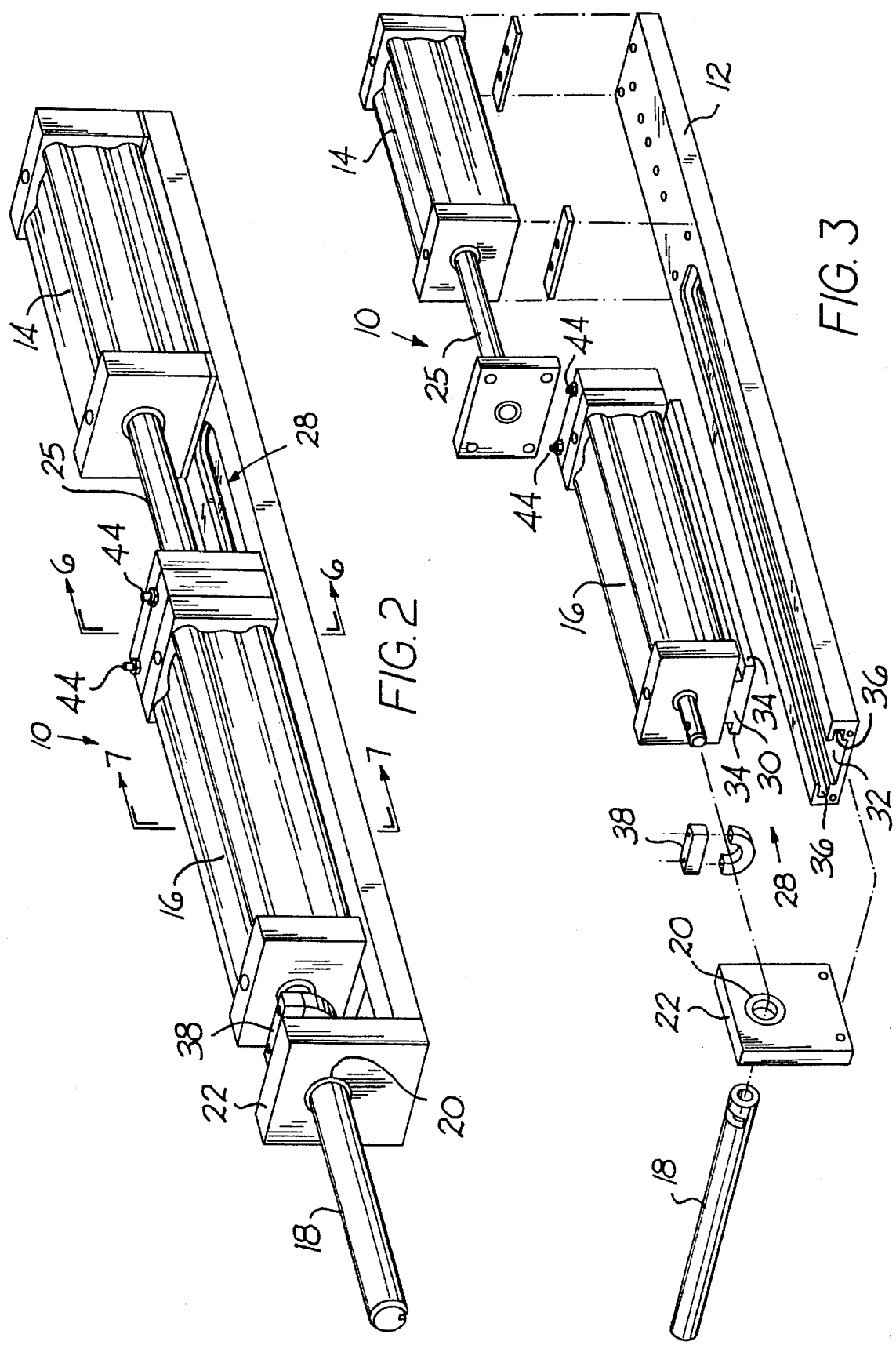

5,570,769

LINEAR AND ROTARY ACTUATOR COMBINATION

BACKGROUND OF THE INVENTION

This is a continuation-in-part of U.S. patent application Ser. No. 07/990,057, filed Dec. 14, 1992, now U.S. Pat. No. 5,404,983, which is hereby incorporated herein by reference. The present invention relates to actuators, and, in particular, to a combination of a rotary actuator and a linear actuator.

It is known in the prior art to combine a rotary actuator and a linear actuator so that the output shaft has independent linear and rotary motion. However, there have been many problems with the prior art combinations. The main problem is that the actuators are combined in such a way that there is a lot of play in the output shaft. This is unacceptable for most applications, in which precise motion control is necessary. Also, the instability of the prior art actuator combinations makes them unsuitable for handling large forces.

SUMMARY OF THE INVENTION

The present invention provides a combination of linear and rotary actuators in which the motion of the output shaft is very closely controlled to eliminate play.

In the present invention, the linear actuator and rotary actuator are mounted on the same base plate. The linear actuator causes the rotary actuator to move linearly relative to the base plate, and there is a guide tied to the base plate which keeps the movement of the rotary actuator on a linear path. There is also a bearing tied to the base plate which supports the output shaft of the rotary actuator. Thus, in the present invention, there is no play in the output shaft, and the output shaft has independent, controlled rotary and linear motion.

BRIEF DESCRIPTION OF THE DRAWINGS

FIG. 2 is a perspective view of the combination of linear and rotary actuators of FIG. 1, with the linear actuator in the extended position;

FIG. 3 is an exploded perspective view of the combination actuator of FIG. 2;

DESCRIPTION OF THE PREFERRED EMBODIMENT

Figure 1:
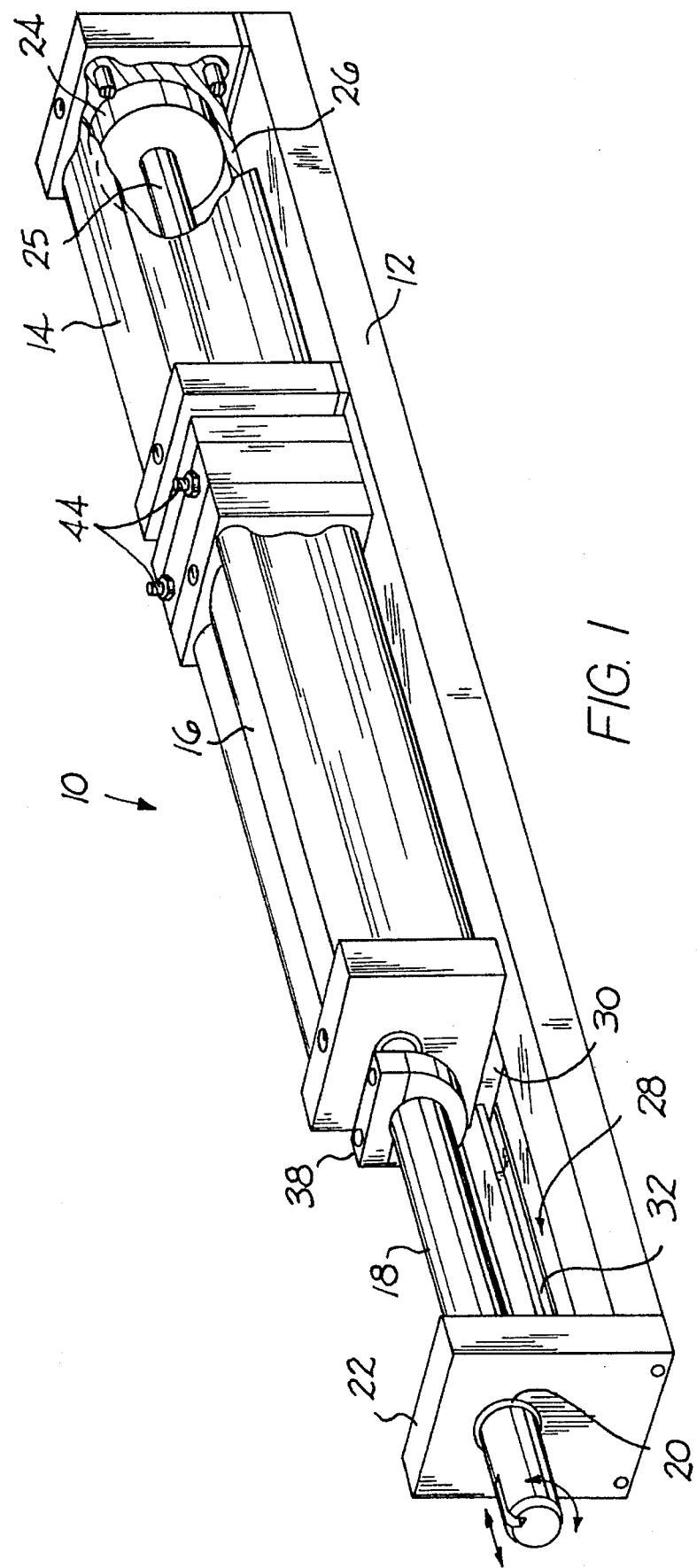
FIG. 1 is a perspective view of a combination of linear and rotary actuators made in accordance with the present invention, with part of the linear actuator cut away and the linear actuator in the retracted position.

FIG. 1 shows the combination actuator 10 of the present invention. The combination actuator 10 includes a base plate 12, a linear actuator 14, which is fixed relative to the base plate 12, and a rotary actuator 16, which moves linearly relative to the base plate 12. The rotary output shaft 18 from the rotary actuator 16 is supported by a journal bearing 20 on a projection 22 from the base plate 12. FIG. 1 shows the combination actuator 10 with the linear actuator 14 in a retracted position, with the piston 24 and shaft 25 fully retracted into the cylinder 26.

FIG. 2 shows the combination actuator 10 with the linear actuator 14 in an extended position, so that the linear actuator shaft 25 is projecting out of the cylinder 26, causing the rotary actuator 16 to move linearly relative to the base plate 12.

FIGS. 2 and 3 show the guide mechanism 28, which restricts the motion of the rotary actuator to linear motion relative to the base plate 12. The guide mechanism 28 includes a T-shaped follower or rail 30 which is fixed to the rotary actuator, and a corresponding T-shaped track 32 on the base plate, which receives the T-shaped rail. In order to install the rotary actuator 16 on the base plate, the rail 30 is inserted into the track 32 at the open end of the base plate 12, before the end piece 22 is mounted on the base plate 12 to close the open end. The outwardly-projecting arms 34 of the rail 30 are received in correspondingly-shaped slots 36 of the track 32.

Figure 4:
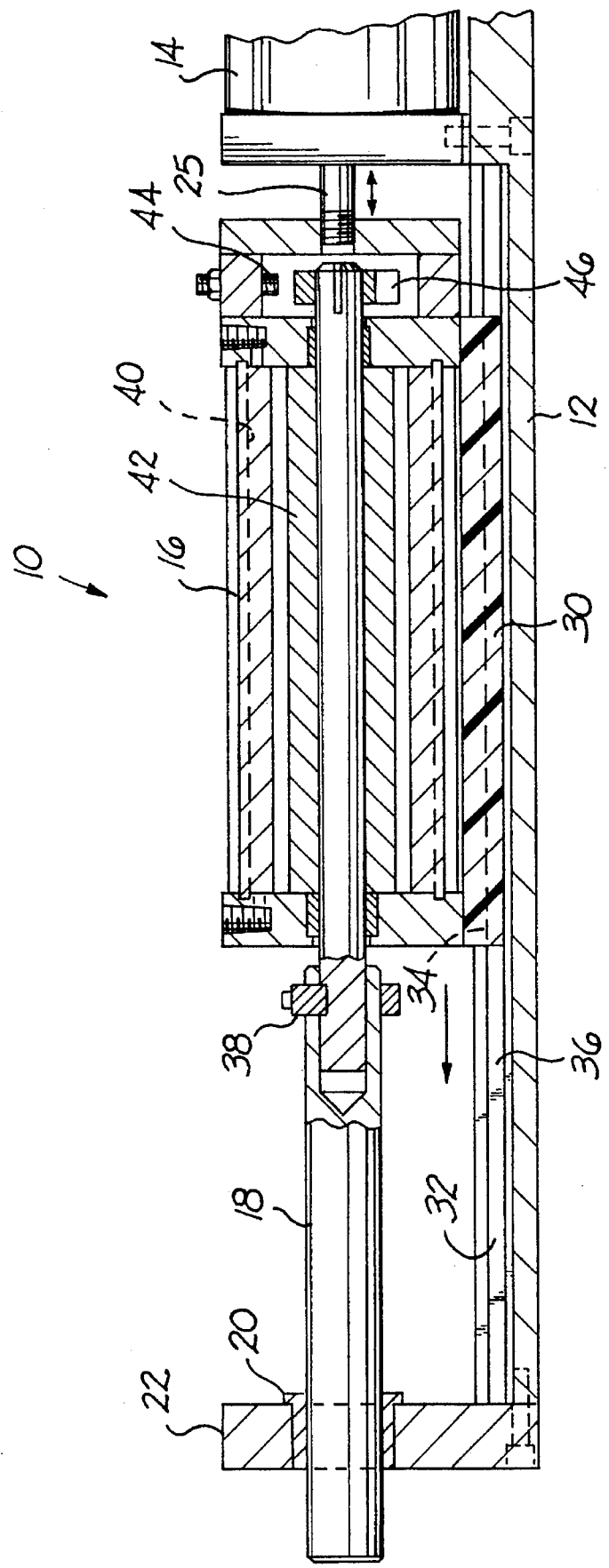
FIG. 4 is a broken-away, side sectional view of the combination actuator of FIG. 1.

FIG. 4 shows that the shaft 25 of the linear actuator 14 is threaded into the housing of the rotary actuator 16. It also shows that the rotary output shaft 18 is extended by means of a coupling 38. FIG. 4 also shows that the linear actuator 14 is fixed to the base plate 12 while the rotary actuator 16 moves linearly along the track 32 of the base plate 12. It also shows the journal bearing 20 which is fixed relative to the base plate 12 and which permits the rotary output shaft 18 to move only in rotary and linear directions relative to the base plate 12.

Figure 6:
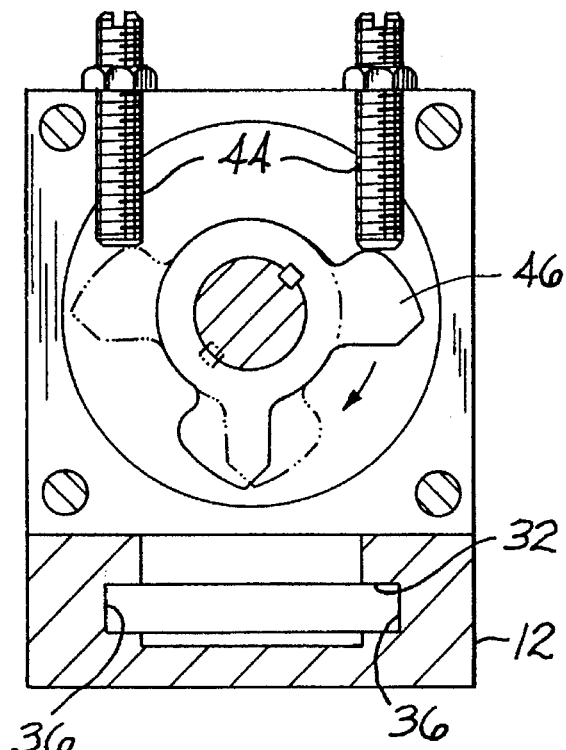
FIG. 6 is a view taken along the section 6—6 of FIG. 2.
Figure 5:
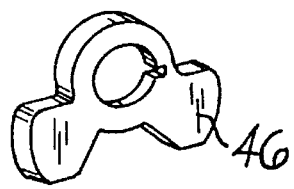
FIG. 5 is a perspective view of the cam shown in the rotary actuator of FIG. 4.
Figure 7:
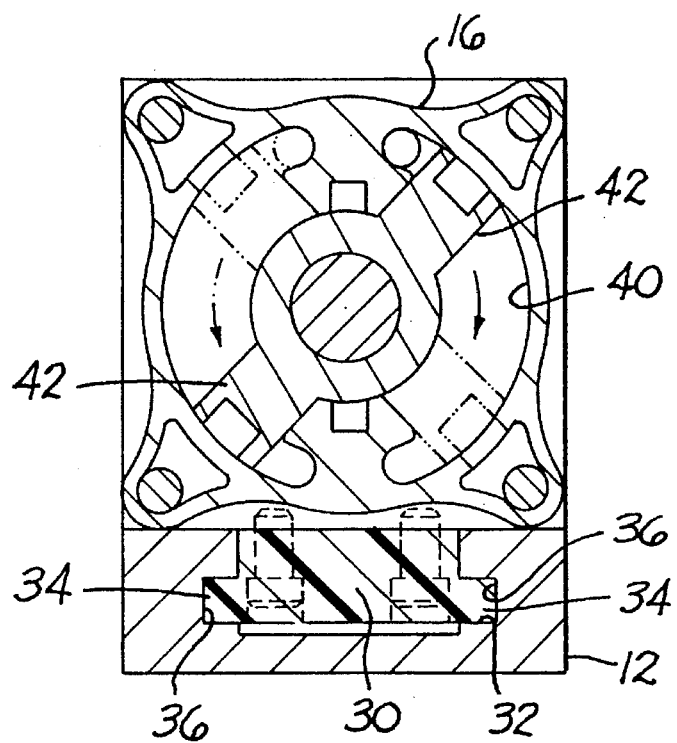
FIG. 7 is a view taken along the section 7—7 of FIG. 2.

FIGS. 5–7 show the internal workings of the rotary actuator 14. The rotary actuator 14 includes a cylinder 40, with two vanes 42 which are sealed relative to the cylinder 40 and which move in a rotary motion relative to the cylinder 40 in response to changes in fluid pressure on opposite sides of the vanes 42. Stops 44, mounted on the rotary actuator housing, define the stopping positions of the rotary actuator 16 by contacting cams 46. These stops 44 can be adjusted to adjust the amount of travel of the actuator 16.

It will be obvious that modifications may be made to the embodiment described above without departing from the scope of the present invention.

What is claimed is:

1. A combination actuator capable of independently moving a shaft in rotary and linear directions, comprising:

a base member;

a linear actuator fixed relative to the base member, said linear actuator including a linear output shaft which moves linearly relative to the base member;

a rotary actuator connected to said linear actuator such that the motion of said linear output shaft causes said rotary actuator to move linearly relative to the base member;

a guide track fixed relative to one of said base member and said rotary actuator;

a track follower mounted on the other of said base member and said rotary actuator, said guide track receiving said track follower so as to restrict the motion of said rotary actuator to linear motion relative to said base member; and a rotary output shaft on said rotary actuator, said rotary output shaft being supported by said base member so as to restrict the motion of said rotary output shaft to linear motion and rotary motion relative to said base member.

2. A combination actuator as recited in claim 1, wherein said track follower is mounted on said rotary actuator and said track is fixed relative to said base member.

3. A combination actuator as recited in claim 1, and further comprising:

a journal bearing which is fixed relative to said base member and which receives said rotary output shaft to prevent orbiting and deflection of said rotary output shaft.

4. A combination actuator as recited in claim 3, wherein said track follower includes outwardly-projecting arms and said guide track defines slots which correspond to the shape of said arms so as to receive said arms, thereby restricting said rotary actuator to linear motion along said guide track.

* * * * *